United States Patent [19]
Hulsing, II

[11] Patent Number: 5,974,879
[45] Date of Patent: Nov. 2, 1999

[54] MICROMACHINED RATE AND ACCELERATION SENSOR

[75] Inventor: Rand H. Hulsing, II, Redmond, Wash.

[73] Assignee: AlliedSignal Inc., Morristown, N.J.

[21] Appl. No.: 09/134,207

[22] Filed: Aug. 14, 1998

Related U.S. Application Data

[62] Division of application No. 08/949,883, Oct. 14, 1997
[60] Provisional application No. 60/047,774, May 27, 1997.

[51] Int. Cl.$^6$ ........................................................... G01P 3/44
[52] U.S. Cl. ................................................ 73/504.3; 438/50
[58] Field of Search .................................... 438/50, 52, 53; 79/504.3, 504.4, 504.12

[56] References Cited

U.S. PATENT DOCUMENTS

| | | | |
|---|---|---|---|
| 5,005,413 | 4/1991 | Novack et al. | 73/517 |
| 5,456,110 | 10/1995 | Hulsing | 73/514.38 |
| 5,476,819 | 12/1995 | Warren | 438/456 |
| 5,760,305 | 6/1998 | Greiff | 73/514.15 |
| 5,796,001 | 8/1998 | Greiff et al. | 73/504.16 |

FOREIGN PATENT DOCUMENTS

| | | | |
|---|---|---|---|
| 0 509 417 A1 | 4/1992 | European Pat. Off. | G01P 15/10 |
| WO 90/10237 | 9/1990 | WIPO | G01P 15/10 |
| WO 95/13545 | 5/1995 | WIPO | G01P 15/10 |
| WO 97/47977 | 12/1997 | WIPO | G01P 15/10 |

*Primary Examiner*—Michael Brock
*Assistant Examiner*—Richard A. Moller

[57] ABSTRACT

A monolithic substrate for acceleration and angular rate sensing. The substrate comprises a support frame, and a first accelerometer formed in the substrate. The first accelerometer has a proof mass including first and second opposite edges. A flexure connects the first edge of the proof mass to the support frame. The flexure defines a hinge axis for the proof mass. The first accelerometer further includes a torsion stabilizing strut coupling a portion of the proof mass to the frame.

4 Claims, 4 Drawing Sheets

MICROMACHINED RATE AND ACCELERATION SENSOR

CROSS-REFERENCE TO RELATED APPLICATION

This application is a divisional of U.S. patent application Ser. No. 08/949,883, filed Oct. 14, 1997; which claims priority from U.S. Provisional Application No. 60/047,774, filed May 27, 1997.

TECHNICAL FIELD

The invention relates to an apparatus and methods for determining the acceleration and rate of angular rotation of a moving body, and in particular, one which is adapted to be formed, for example through micromachining, from a silicon substrate.

BACKGROUND OF THE INVENTION

The use of tactical grade inertia measuring units has been limited by their cost to high-priced systems such as military aircraft, missiles, and other special markets. The cost of inertia measuring units is dominated by the expensive discrete gyroscopes and discrete accelerometers and attendant electronics used to drive and convert these signals for use in computer systems.

Other problems with inertial measuring units are high power consumption and large package size. The problems of high power consumption and large package size further limit applications to larger equipment boxes in equipment racks. For example, a hockey puck sized tactical grade navigator is not known in the prior art.

Still other problems with the prior art include a limitation in rate bias accuracy cause by modulation of the accelerometer due to coupling from the dither motion which causes phase angle sensitivity of the rate data. A further limitation in rate bias accuracy is caused by modulation of the accelerometer due to coupling of external vibration components coupling into the rate data.

Exemplary rate and acceleration sensors, components of such sensors, and methods of forming the same are described in the following patents all of which are assigned to the assignee of this disclosure, and all of which are expressly incorporated herein by reference: U.S. Pat. Nos. 5,005,413; 5,168,756; 5,319,976; 5,331,242; 5,331,854; 5,341,682; 5,367,217; 5,456,110; 5,456,111; 5,557,046; and 5,627,314.

By way of background, the rate of rotation of a moving body about an axis may be determined by mounting an accelerometer on a frame and dithering it, with the accelerometer's sensitive axis and the direction of motion of the frame both normal to the rate axis about which rotation is to be measured. For example, consider a set of orthogonal axes X, Y, and Z oriented with respect to the moving body. Periodic movement of the accelerometer along the Y axis of the moving body with its sensitive axis aligned with the Z axis results in the accelerometer experiencing a Coriolis acceleration directed along the Z axis as the moving body rotates about the X axis. A Coriolis acceleration is that perpendicular acceleration developed while the body is moving in a straight line, due to rotation of the frame on which it is mounted. The Coriolis acceleration acting on the accelerometer is proportional to the velocity of the moving sensor body along the Y axis and its angular rate of rotation about the X axis. An output signal from accelerometer thus includes a DC or slowly changing component or force signal F representing the linear acceleration of the body along the Z axis, and periodic component or rotational signal ω representing the Coriolis acceleration resulting from rotation of the body about the X axis.

The Coriolis component can be produced by vibrating the accelerometer and causing it to dither back and fourth along a line perpendicular to the input axis of the accelerometer. If the frame on which the accelerometer is mounted is rotating, the Coriolis acceleration component of the accelerometer's output signal will be increased proportional to the dither velocity. If the dither amplitude and frequency are held constant, then the Coriolis acceleration is proportional to the rotation rate of the frame.

The linear acceleration component and the rotational component representing the Coriolis acceleration may be readily separated by using two accelerometers adjacent to each other and processing their output signals using summed difference techniques. In U.S. Pat. No. 4,510,802, assigned to the assignee of the present invention, two accelerometers are mounted upon a parallelogram with their input axes pointing in opposite directions. An electromagnetic D'Arsonval coil is mounted on one side of the parallelogram structure and is energized with a periodically varying current to vibrate the accelerometers back and forth in a direction substantially normal to their sensitive or input axes. The coil causes the parallelogram structure to vibrate, dithering the accelerometers back and forth. By taking the difference between the two accelerometer outputs, the linear components of acceleration are summed. By taking the sum of the two outputs, the linear components cancel and only the Coriolis or rotational components remain.

U.S. Pat. No. 4,510,801, commonly assigned to the assignee of this invention, describes a processing of the output signals of two accelerometers mounted for periodic, dithering motion to obtain the rotational rate signal ω in the force or acceleration signal F representing the change in velocity; i.e., acceleration, of the moving body along the Z axis.

U.S. Pat. No. 4,510,802, commonly assigned to the assignee of this invention, describes a control pulse generator, which generates and applies a sinusoidal signal of a frequency ω to the D'Arsonval coil to vibrate the parallelogram structure and thus the first and second accelerometer structures, with a dithering motion of the same frequency ω. The accelerometer output signals are applied to a processing circuit, which sums the accelerometer output signals to reinforce the linear components indicative of acceleration. The linear components are integrated over the time period T of the frequency corresponding to the dithering frequency to provide the force signal F, which represents the change in velocity; i.e., acceleration, along the Z axis. The accelerometer output signals are also summed, whereby their linear components cancel and their Coriolis components are reinforced to provide a signal indicative of frame rotation. That different signal is multiplied by a zero mean periodic function.

The resulting signal is integrated over a period T of the frequency ω by a sample and hold circuit to provide the signal ω representing the rate of rotation of the frame.

The D'Arsonval coil is driven by a sinusoidal signal of the same frequency ω which corresponded to the period T in which the linear acceleration and Coriolis component signals were integrated. In particular, the pulse generator applies a series of pulses at the frequency ω to a sine wave generator, which produces the substantially sinusoidal voltage signal to be applied to the D'Arsonval coil. A pair of pick-off coils produce a feedback signal indicative of the motion imparted to the accelerometers. That feedback signal is summed with the input sinusoidal voltage by a summing junction whose output is applied to a high gain amplifier. The output of that amplifier, in turn, is applied to the D'Arsonval type drive coil. The torque output of the D'Arsonval coil interacts with the dynamics of the parallelogram structure to produce the vibrating or dither motion. In accordance with well known servo theory, the gain of the amplifier is set high so that the voltage applied to the summing junction and the feedback voltage are forced to be substantially equal and the motion of the mechanism will substantially follow the drive voltage applied to the summing junction.

U.S. Pat. No. 4,881,408 describes the use of vibrating beam force transducers in accelerometers. In U.S. Pat. No. 4,372,173, the force transducer takes the form of a double-ended tuning fork fabricated from crystalline quartz. The transducer comprises a pair of side-by-side beams which are connected to common mounting structures at their ends. Electrodes are deposited on the beams and a drive circuit applies a periodic voltage signal to the electrodes, causing the beams to vibrate toward and away from one another, 180 degrees out of phase. In effect, the drive circuit and beams form an oscillator with the beams playing the role of a frequency controlled crystal; i.e., the mechanical resonance of the beams controls the oscillation frequency. The vibrating beams are made of crystalline quartz, which has piezoelectric properties. Application of periodic drive voltages to such beams cause them to vibrate toward and away from one another, 180 degrees out of phase. When the beams are subjected to accelerating forces, the frequency of the mechanical resonance of the beams changes, which results in a corresponding change in the frequency of the drive signal. When subjected to acceleration forces that cause the beams to be placed in tension, the resonance frequency of the beams and thus the frequency of the drive signal increases. Conversely, if the beams are placed in compression by the acceleration forces, the resonance frequency of the beams and the frequency of the drive signal is decreased.

U.S. application Ser. No. 07/316,399 describes accelerometers using vibrating force transducers that require materials with low internal damping to achieve high Q values that result in low drive power, low self heating and insensitivity to electronic component variations. Transducer materials for high accuracy instruments also require extreme mechanical stability over extended cycles at high stress levels. Crystalline silicon possesses high Q values, and with the advent of low-cost, micro-machined mechanical structures fabricated from crystalline silicon, it is practical and desirable to create vibrating beams from a silicon substrate. Commonly assigned U.S. Pat. No. 4,912,990 describes a vibrating beam structure fabricated from crystalline silicon and includes an electric circuit for applying a drive signal or current along a current path that extends in a first direction along a first beam and in a second, opposite, direction along a second beam parallel to the first. A magnetic field is generated that intersect substantially perpendicularly to the conductive path, whereby the first and second beams are caused to vibrate towards and away from one another, 180 degrees out of phase.

Digital techniques employ stable, high frequency crystal clocks to measure a frequency change as an indication of acceleration forces applied to such vibrating beam accelerometers. To ensure precise integration or cosine demodulation, a crystal clock is used to precisely set the frequency of the dither drive signal. The outputs from two accelerometers are fed into counters to be compared to a reference clock signal produced by the crystal clock. A microprocessor reads the counters and processes the data to provide a force signal F and a rotational signal $\omega$. The main advantage of digital processing is the ability to demodulate with extreme precision. The short-term stability of the reference crystal clock allows the half cycle time basis to be precisely equal. Thus, a constant input to the cosine demodulator is chopped up into equal, positive half cycle and negative half cycle values, whose sum is exactly zero.

In an illustrated embodiment, the two accelerometer signals are counted in their respective counters over a 100 Hz period (corresponding to a hundred Hz of the dither frequency $\omega$) and are sampled at a 400 Hz data rate corresponding to each quarter cycle of the dither motion. The two accumulated counts are subtracted to form the force signal F. Since the counters act as an integrator, the acceleration signal is changed directly to a velocity signal. Taking the difference of the acceleration signals tends to reject all Coriolis signals as does the counter integration and locked period data sampling.

The Coriolis signals are detected by a cosine demodulation. The cosine demodulated signals from the first and second accelerometers are summed to produce the $\Delta\theta$ signal. Again, the counters integrate the rate data to produce an angle change. The sum also eliminates any linear acceleration and the demodulation cancels any bias source including bias operating frequency and accelerometer bias. The accelerometer temperature is used in a polynomial model to provide compensation for all the coefficients used to convert the frequency counts into output units. Thus, the scale factor, bias and misalignment of the sensor axes are corrected over the entire temperature range.

The demodulation of the frequency sample is straightforward once the data is gathered each quarter cycle. The cosine demodulation is simply the difference between the appropriate half cycles. The linear acceleration is the sum of all samples.

SUMMARY OF THE INVENTION

The invention provides a monolithic substrate for acceleration and angular rate sensing. The substrate includes a support frame including a post, and an accelerometer formed in the substrate. The accelerometer has a proof mass including first and second legs and a main body portion connecting the legs and accommodating common movement of the legs. The accelerometer further includes a flexure including first and second spaced apart flexure portions respectively connecting the first and second legs to the support frame. The flexure defines a hinge axis for the proof mass. The post is disposed between the flexure portions and extends toward the main body portion and between the legs.

One aspect of the invention provides a monolithic substrate for acceleration and angular rate sensing. The substrate comprises a support frame, and a first accelerometer formed in the substrate. The first accelerometer has a proof mass including first and second opposite edges. A flexure connects the first edge of the proof mass to the support frame. The flexure defines a hinge axis for the proof mass. The first accelerometer further includes a torsion stabilizing strut coupling a portion of the proof mass to the frame. The strut is positioned closer to the flexure than to the second edge.

Another aspect of the invention provides a monolithic substrate for acceleration and angular rate sensing. The substrate comprises a support frame, a first accelerometer formed in the substrate, and a second accelerometer formed in the substrate. The first accelerometer has a proof mass including first and second opposite edges, and third and fourth opposite edges. The first accelerometer further includes a flexure connecting the first edge of the proof mass to the support frame. The flexure defines a hinge axis for the proof mass. The first accelerometer further includes a first force-sensing member coupled to the proof mass at a location intermediate the hinge axis and the second edge with respect to a direction extending from the first edge to the second edge and intermediate the third and fourth edges with respect to a direction extending from the third edge to the fourth edge. In a preferred aspect, the force-sensing member comprises first and second vibratable beams. The second accelerometer has a second proof mass including fifth and sixth opposite edges, and seventh and eighth opposite edges, and a flexure connecting the fifth edge to the support frame. The flexure of the second accelerometer defines a hinge axis for the second proof mass. The second accelerometer further includes a second force-sensing member coupled to the second proof mass at a location intermediate the hinge axis of the second accelerometer and the sixth edge with respect to a direction extending from the fifth edge to the sixth edge and intermediate the seventh and eighth edges with respect to a direction extending from the seventh edge to the eighth edge. In a preferred aspect, the force-sensing member comprises third and fourth vibratable beams.

The invention resolves significant problems of the prior art by providing a small sized, low-cost, tactical grade navigator operable using a computer to perform a variety of applications which heretofore could not be addressed. For example, a tactical grade inertial measuring unit is too large, heavy and expensive to be carried by a guided munitions, a mini-air launch decoy, or a single person in a "dismounted soldier" application.

The present invention provides a small sized, low-cost tactical grade navigator having the following characteristics: a mass-producible sensor; a small, easily fabricated inertial measuring unit; direct digital compatibility with a computer; and a simplified system electronics.

According to yet another aspect of the present invention, the present invention provides improved performance by providing two accelerometers having matching natural frequencies and scale factors when the two accelerometers are manufactured simultaneously within a single substrate.

According to yet another aspect of the present invention, the present invention provides reduced processing sensitivity by providing two accelerometers having matching natural frequencies and scale factors when the two accelerometers are manufactured simultaneously within a single substrate.

According to still another aspect of the present invention, the present invention provides a reduced cost rate and acceleration sensor by providing a simplified electrode pattern. According to yet another aspect of the present invention, the present invention provides reduced cost through simplified manufacturing by providing all electrode paths formed on only one side of the substrate.

According to still another aspect of the present invention, the present invention provides simplified manufacturing and a simplified electronics interface by providing multiple hairspring flexures connecting the sensor to the input/output interconnects which permits all the electrode paths to be formed on only one side of the substrate.

BRIEF DESCRIPTION OF THE DRAWINGS

Preferred embodiments of the invention are described below with reference to the following accompanying drawings.

DETAILED DESCRIPTION OF THE PREFERRED EMBODIMENTS

Copending U.S. application Ser. No. 08/786,185, filed Jan. 20, 1997, incorporated herein by reference, describes and claims an apparatus and method for determining the rate of angular rotation of a moving body and, in particular, one which is adapted to be formed through micromachining of a silicon substrate.

A basic sensor configuration is described in U.S. Pat. No. 5,241,861, issued Sep. 7, 1993, and U.S. Pat. No. 5,331,853, issued Jul. 26, 1994, commonly assigned and incorporated herein by reference. The described configuration includes two vibrating beam accelerometers fabricated in a dither structure from a monolithic silicon wafer. One limiting factor in rate bias accuracy is the modulation of the accelerometer due to coupling from the dither motion. This modulation can cause extreme phase angle sensitivity of the rate data. Also, external vibration of the package can couple into the rate channel due to this phase angle sensitivity. The invented sensor and methodologies through which it can be formed are directed to solving these and other problems.

Figure 1:
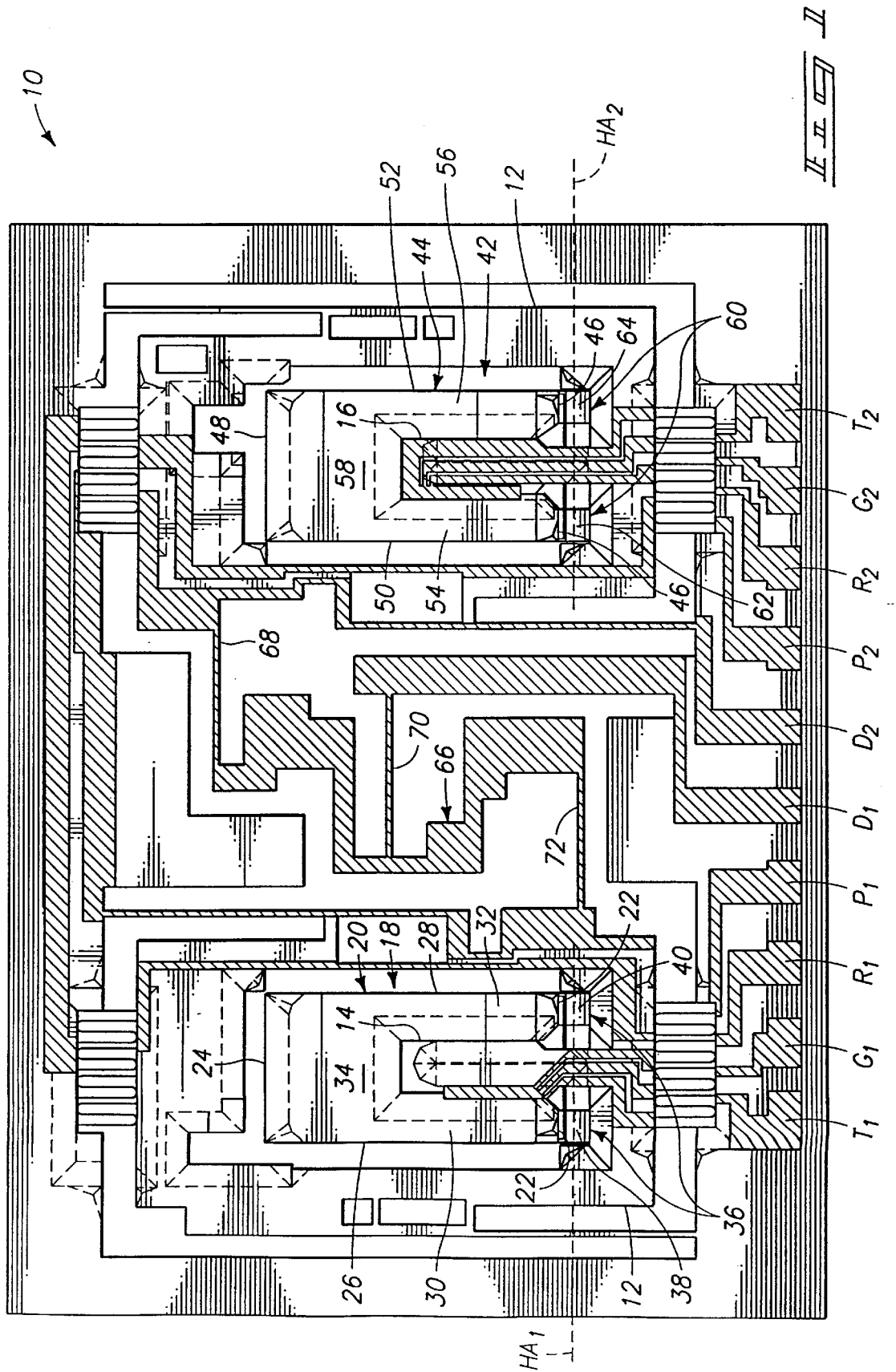
FIG. 1 is a top plan view of a unitary substrate out of which are formed a pair of accelerometers in accordance with a preferred aspect of the invention.

FIG. 1 shows a monolithic substrate for acceleration and angular rate sensing generally at 10. The substrate includes a support frame 12 including first and second posts 14, 16. The substrate further includes a first accelerometer 18 formed in the substrate. First accelerometer 18 has a proof mass 20 including first and second opposite edges 22, 24 respectively, and third and fourth opposite edges 26, 28 respectively. The proof mass includes first and second legs 30, 32 and a main body portion 34 connecting the legs and accommodating common movement of the legs relative to frame 12 in response to an acceleration force. First accelerometer 18 further includes a flexure 36 connecting first edge 22 of proof mass 20 to support frame 12. Flexure 36 defines a hinge axis $HA_1$ for proof mass 20. Flexure 36 includes first and second spaced apart flexure portions 38, 40 respectively connecting the first and second legs 30, 32 to support frame 12. A portion of frame 12 which defines first post 14 extends intermediate first and second flexure portions 38, 40 and toward the second edge 24. More particularly, first post 14 is disposed between flexure portions 38, 40 and extends toward main body portion 34 and between legs 30, 32.

The substrate further includes a second accelerometer 42 formed in the substrate. Second accelerometer 42 is similar to the first accelerometer 18. Second accelerometer 42 has a second proof mass 44 including fifth and sixth opposite edges 46, 48, and seventh and eighth opposite edges 50, 52. Second proof mass 44 includes third and fourth legs 54, 56 and a main body portion 58 respectively connecting third and fourth legs 54, 56 and accommodating common movement thereof. Second accelerometer 42 further includes a flexure 60 connecting fifth edge 46 to support frame 12. Second flexure 60 includes third and fourth spaced apart flexure portions 62, 64 respectively, connecting third and fourth legs 54, 56 to support frame 12. Second post 16 is disposed between third and fourth flexure portions 62, 64 and extends toward the main body portion 58 of second accelerometer 42 between third and fourth legs 54, 56. Flexure 60 defines a hinge axis $HA_2$ for second proof mass 44. Preferably, hinge axis $HA_1$ and hinge axis $HA_2$ define a common axis. Hinge axis $HA_2$ is closer to hinge axis $HA_1$ than it is to second edge 24 of proof mass 20.

A link 66 is provided and connects accelerometers 18, 42 together and acts as a rocker arm to ensure that the accelerometers can be dithered 180° out of phase. A discussion of various aspects of the dynamics of dithering as such pertains to accelerometers can be found in many of the references mentioned above. Link 66 includes three flexures 68, 70, and 72 which operably connect the respective accelerometers. Flexure 70 defines a rotation point for link 66 so that the link essentially acts as a rocker arm. Other links are described in more detail in my U.S. Pat. No. 5,331,853, incorporated by reference above.

A plurality of contact pads T1, G1, R1, P1, D1, and D2, P2, R2, G2, and T2 are disposed along one side of substrate 10. These pads provide contacts through which desirable electrical connection can be made to outside-world circuitry for the dither drive, dither pick-off, beam or tine drives, and beam or tine pick-offs, some of which are discussed in more detail below. Such contact pads are connected with pertinent conductive paths on frame 12 by virtue of a plurality of hair spring connectors or flexures which are discussed in more detail below.

Figure 2:
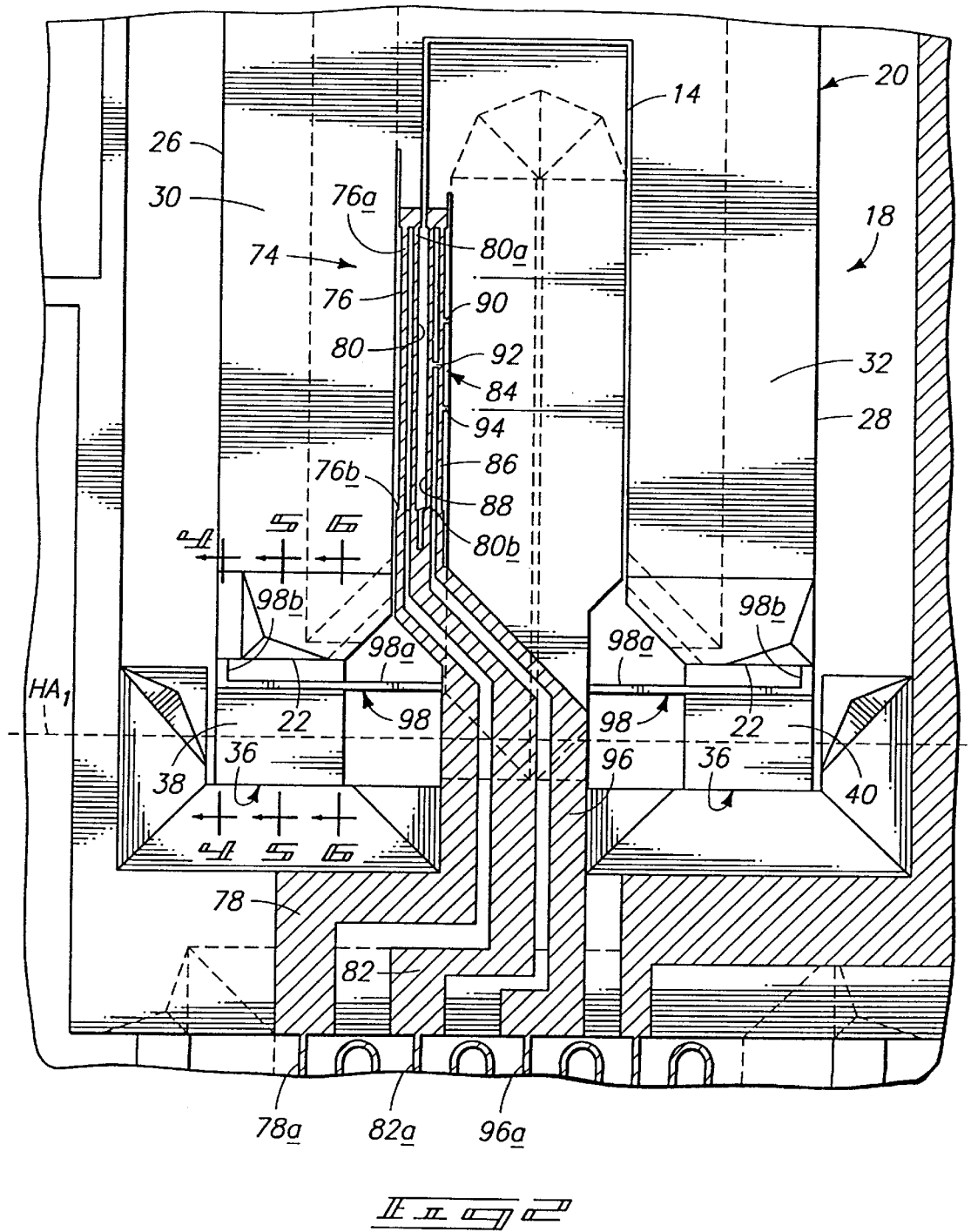
FIG. 2 is an enlarged, fragmentary view of a portion of one of the FIG. 1 accelerometers, showing in particular, one force-sensing element configuration.

FIG. 2 shows a portion of first accelerometer 18 in more detail. The first accelerometer further includes a force-sensing assembly 74. In the illustrated and preferred embodiment, force-sensing assembly 74 comprises a first force-sensing member which includes a first vibratable or vibrating beam 76 coupled to proof mass 20 at a location intermediate hinge axis $HA_1$ and second edge 24 (FIG. 1) with respect to a direction extending from first edge 22 to second edge 24. Beam 76 is also coupled to the proof mass intermediate third and fourth edges 26, 28 with respect to a direction extending from third edge 26 to fourth edge 28. More particularly, first vibratable beam 76 includes an upper end 76a which is coupled to proof mass 20 at a location intermediate hinge axis $HA_1$ and the main body portion 34 (FIG. 1) with respect to a direction extending from hinge axis $HA_1$ to main body portion 34. Beam 76 also includes a lower end 76b which is coupled to frame 12 via post 14. A conductive path 78 is operably coupled with first beam 76 and extends at least partially along post 14.

First accelerometer 18 further includes as part of the illustrated force sensing member, a second vibratable or vibrating beam 80 proximate first beam 76 and having an upper end 80a coupled to proof mass 20, and a lower end 80b coupled to frame 12 via post 14. Beam 80 is coupled to frame 12 at a location intermediate hinge axis $HA_1$ and second edge 24 (FIG. 1) with respect to a direction extending from first edge 22 to second edge 24. Beam 80 is also coupled intermediate third and fourth edges 26, 28 with respect to a direction extending from third edge 26 to fourth edge 28. More particularly, second vibratable beam 80 is coupled to post 14 at a location intermediate hinge axis $HA_1$ and main body portion 34 with respect to a direction extending from hinge axis $HA_1$ to main body portion 34. A conductive path 82 is coupled to second beam 80 and extends at least partially along post 14. In the illustrated embodiment, the entirety of beams 76, 80 of first accelerometer 18 are disposed between hinge axis $HA_1$ of the first accelerometer and the second edge 24. The first and second beams are preferably elongated along respective directions that are both substantially normal to hinge axis $HA_1$. The force-sensing member illustrated and discussed just above, is intended to present but one, non-limiting example of an exemplary force-sensing member which is suitable for use with the present invention. Accordingly, other force-sensing members, and ones which are not necessarily vibratable in nature, could be employed.

The illustrated force-sensing assembly also includes a reference resistor 84 in the form of beams 86, 88. Beams 86, 88 are tied together by a plurality of pins 90, 92, and 94. Beams 86, 88 do not vibrate and are provided to match the electrical path resistance of beams 76, 80. A conductive path 96 is provided and operably connects with beams 86, 88. Each of conductive paths 78, 82, and 96 are connected via hair spring flexures or connectors 78a, 82a, and 96a respectively, with electrical contact pads (FIG. 1) which, in turn, make desirable electrical connections with outside world circuitry. When an electrical current is provided via the conductive path over vibrating beams 76, 80, a voltage drop develops relative to those beams. Similarly, a current provided over beams 86, 88 develops a generally identical voltage drop such that the two voltage drops can be subtracted from one another and cancel. This assists outside circuitry in its discrimination of the feedback signals from the vibrating beams.

Figure 4:
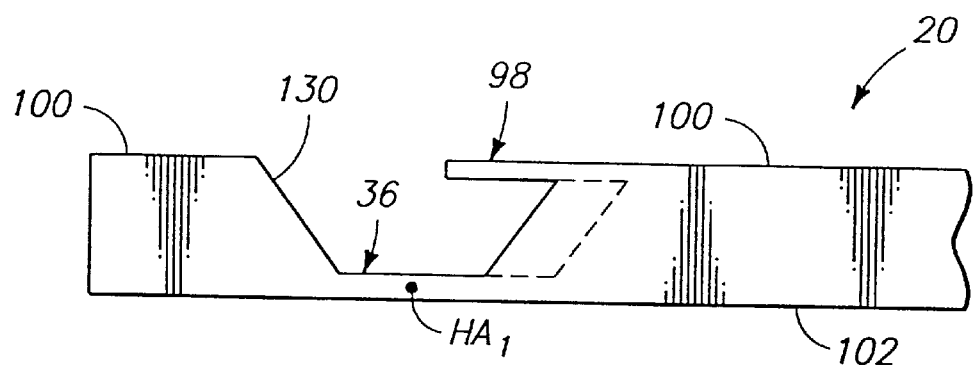
FIG. 4 is a view which is taken along line 4—4 in FIG. 2.
Figure 5:
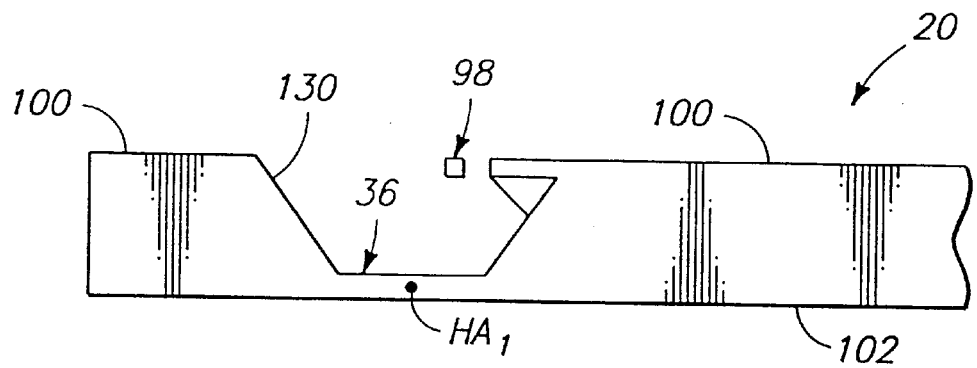
FIG. 5 is a view which is taken along line 5—5 in FIG. 2.
Figure 6:
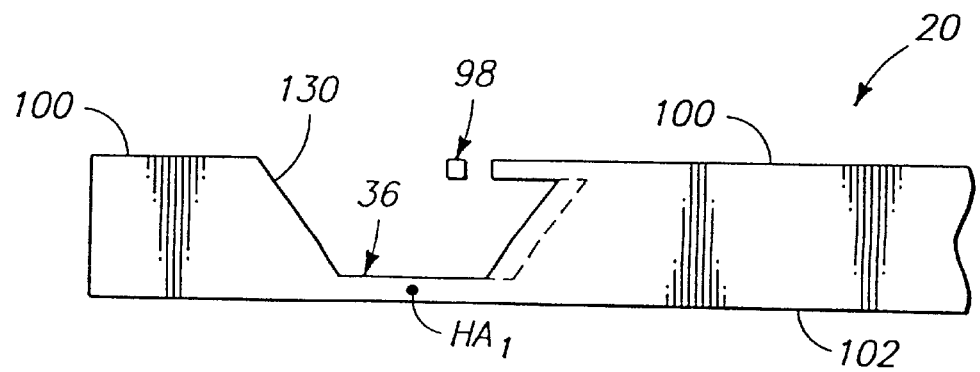
FIG. 6 is a view which is taken along line 6—6 in FIG. 2.

First accelerometer 18 further includes at least one torsion stabilizing strut 98 coupling a portion of proof mass 20 to frame 12. Preferably, two such struts 98 are provided. In the illustrated example, each strut includes a generally elongate first portion 98a and a somewhat shorter second portion 98b. First portion 98a joins with post 14 at one end and extends generally away therefrom in a direction which is generally parallel to hinge axis $HA_1$. First portion 98a joins up with second portion 98b, with second portion 98b extending generally away therefrom and toward edge 22 of proof mass 20 where it joins therewith. The struts include portions which extend over flexure 36. The struts also include portions which extend over open areas intermediate flexures 36 and post 14. In the illustrated-example, and as viewed in FIG. 2, a little more than one half of first portion 98a extends over respective flexure portions 38, 40; and a substantial portion of second portion 98b extends over respective flexure portions 38, 40. It will be understood that the above-described strut construction and location is but one preferred example, and that other constructions and locations are possible. Moreover, it is possible for the strut(s) to connect at locations other than those specifically shown and described. In the illustrated example, struts 98 are positioned closer to flexure 36 than to second edge 24. FIGS. 4–6 show that proof mass 20 has first and second surfaces 100, 102 defining respective first and second planes, and hinge axis $HA_1$ is generally parallel to such planes. Flexure 36 is closer to second surface 102 than to first surface 100 with respect to a direction normal to the first plane. At least a portion of strut 98 overlies flexure 36.

Figure 3:
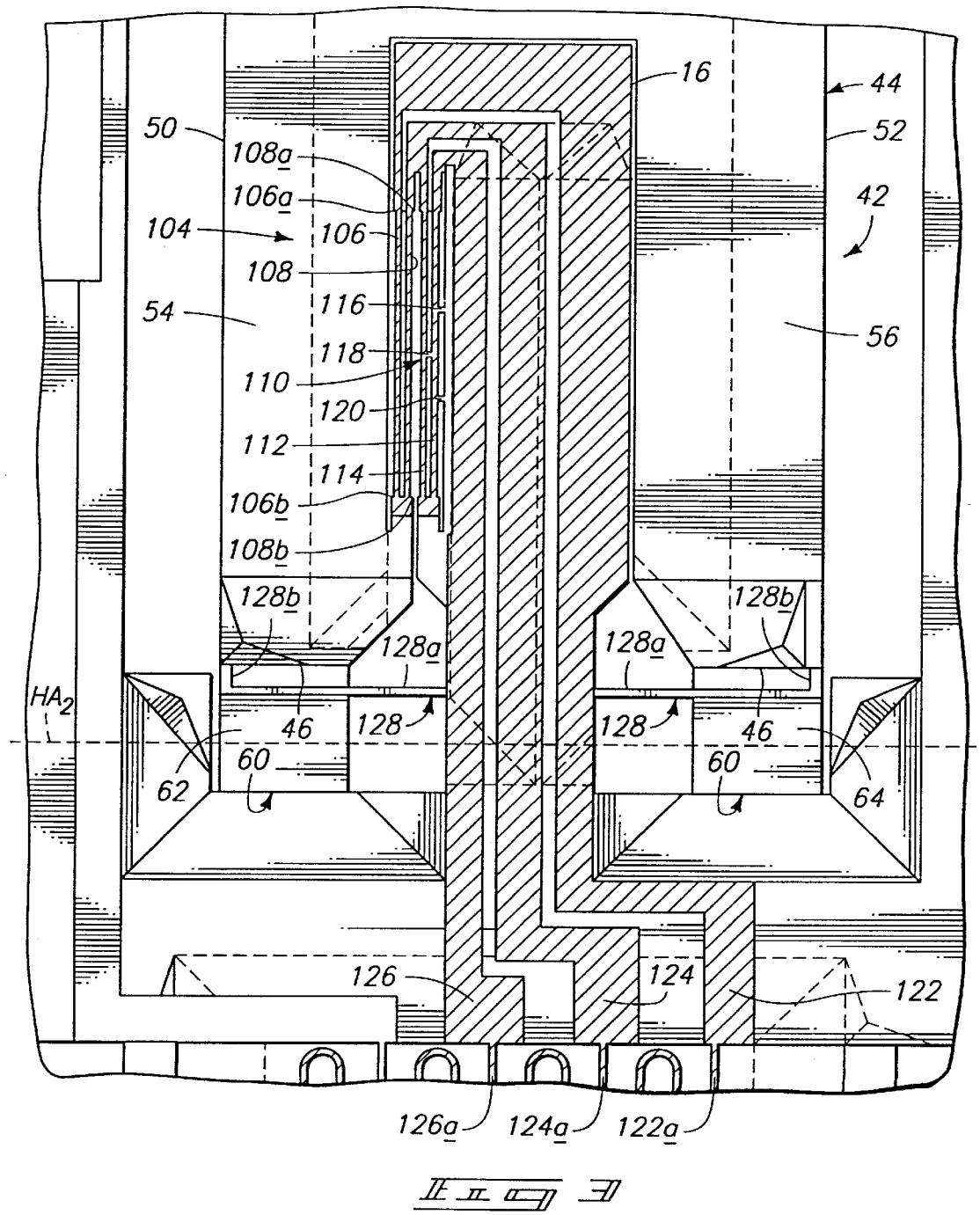
FIG. 3 is an enlarged, fragmentary view of a portion of the other of the FIG. 1 accelerometers, showing in particular, one force-sensing element configuration.

FIG. 3 shows second accelerometer 42 in more detail. Second accelerometer 42 includes a force-sensing assembly 104. In the illustrated and preferred embodiment, force-sensing assembly 104 comprises a second force-sensing member which includes a third vibratable beam 106 coupled to second proof mass 44 at a location intermediate hinge axis HA$_2$ and sixth edge 48 (FIG. 1) with respect to a direction extending from fifth edge 46 to sixth edge 48. Beam 106 is also coupled intermediate seventh and eighth edges 50, 52 with respect to a direction extending from seventh edge 50 to eighth edge 52.

Second accelerometer 42 further includes as part of the illustrated force-sensing member, a fourth vibratable beam 108 proximate third beam 106 and coupled to frame 12, i.e., post 16, at a location intermediate hinge axis HA$_2$ and sixth edge 48 (FIG. 1) with respect to a direction extending from fifth edge 46 to sixth edge 48. Beam 108 is also coupled intermediate seventh and eighth edges 50, 52 with respect to a direction extending from seventh edge 50 to eighth edge 52. In the illustrated embodiment, the entirety of beams 106, 108 are disposed between hinge axis HA$_2$ of the second accelerometer and the sixth edge 48. Third and fourth beams 106, 108 are elongated along respective directions that are both substantially normal to hinge axis HA$_2$ of the second accelerometer. The force-sensing member illustrated and discussed just above, is intended to present but one, non-limiting example of an exemplary force-sensing member which is suitable for use with the present invention. Accordingly, other force-sensing members, and ones which are not necessarily vibratable in nature, could be employed.

The illustrated force-sensing assembly also includes a reference resistor 110 in the form of beams 112, 114 which are tied together with three pins 116, 118, and 120. Beams 112, 114 perform in substantially the same way as described above with respect to beams 86, 88 (FIG. 2) of first accelerometer 18. Conductive paths are provided and by virtue of the dynamic operation of the accelerometers described just below, are configured somewhat differently than the electrical connections or conductive paths described above. Accordingly, a conductive path 122 is provided and extends along post 16 to ultimately connect with and be formed over beam 106. A conductive path 124 is provided and extends generally along a same path as conductive path 122 and connects with beams 108 and 114. A conductive path 126 is provided and operably connects with beam 112. Each of conductive paths 122, 124, and 126 are connected via hair spring connectors 122a, 124a, and 126a respectively, with electrical contact pads (FIG. 1) which, in turn, make desirable electrical connections with outside world circuitry.

The second accelerometer further includes at least one second torsion stabilizing strut 128 coupling a portion of second proof mass 44 to frame 12. Preferably, two such struts 128 are provided. In the illustrated example, each strut includes a generally elongate first portion 128a and a somewhat shorter second portion 128b. First portion 128a joins with post 16 at one end and extends generally away therefrom in a direction which is generally parallel to hinge axis HA$_2$. First portion 128a joins up with second portion 128b, with second portion 128b extending generally away therefrom and toward edge 46 of proof mass 44 where it joins therewith. The struts include portions which extend over flexure 60. The struts also include portions which extend over open areas intermediate flexures 60 and post 16. In the illustrated example, and as viewed in FIG. 3, a little more than one half of first portion 128a extends over respective flexure portions 62, 64; and a substantial portion of second portion 128b extends over respective flexure portions 62, 64. It will be understood that the above-described strut construction and location is but one preferred example, and that other constructions and locations are possible. Moreover, it is possible for the strut(s) to connect at locations other than those specifically shown and described. In the illustrated example, struts 128 are positioned closer to flexure 60 than to sixth edge 48.

FIGS. 2 and 3 show that portions of respective posts 14, 16 extend away from frame 12 (FIG. 1) and into an area occupied by respective proof masses 20, 44. Posts 14, 16, constitute portions of the frame. The provided posts enable desirable conductive paths, such as those discussed above, to be formed and established with the respective vibrating beams mentioned above. For example, as viewed in FIG. 2, beams 76, 80 have upper ends 76a, 80a respectively, which are connected to proof mass 20 proximate first leg 30. The beams also include lower ends 76b, 80b respectively, which are connected to frame 12. FIG. 3 shows that beams 106, 108 include upper ends 106a, 108a respectively, which are connected to frame 12 via post 16. The beams also include respective lower ends 106b, 108b which are connected to proof mass 44 proximate third leg 54. By virtue of the above-described beam connections relative to frame 12 and the respective proof masses configured thereon, when the proof masses experience an acceleration, both deflect in the same direction. As a result, the vibrating beams on one proof mass are placed into tension while the other vibrating beams are placed into compression. By virtue of the change in the vibration frequency of the respective vibrating beams when either a tensive or compressive force is experienced, acceleration can be ascertained via electrical circuits which are operably connected therewith and configured to determine such differences.

The present invention resolves significant problems of the prior art by providing a force-sensing member between the flexures. According to one aspect of the present invention, the force-sensing member is located in a center region proximate the proof mass and comprises a pair of vibratable beams. Improvements in rate bias accuracy are achieved by substantially eliminating the modulation of the accelerometer due to coupling from the dither motion which can cause extreme phase angle sensitivity of the rate data. In another example, the present invention substantially eliminates coupling of external vibrations into the rate channel which was a limitation in the prior art due to phase angle sensitivity.

Other advantages of locating the force sensing member according to the present invention include: that the preferred beams can be readily realized through micromachining techniques; the dither modulation can be substantially eliminated or reduced to acceptably small levels; the two accelerometers can be made to match natural frequencies and scale factors; and the structures can be fabricated with very low processing sensitivity.

Rate sensor accuracy is a function of full scale g-range, dither frequency and phase resolution. For the case of a sensor dithered at 1400 Hz, an equivalent clock resolution of 10 nanoseconds and a misalignment of 70 $\mu$radians, the rate according to the present invention exhibits a bias uncertainty on the order of 1 degree per hour. By using the illustrated center beam design, one aspect of which is described above, the accelerometer phase can be modeled to provide the above-mentioned accuracy over the sensor's operational temperature range.

The above-described sensor is also easily fabricated and provides a construction which carries with it many convenient advantages. For example, the entire electrode path (beam connections, pick-off, and dither connections) are deposited on one side of the substrate. Previous sensors have required electrode paths on both sides of the substrate. This adds to processing complexity. Also, all of the sensor input/output interconnects are on one edge of the substrate.

Locating the input/output interconnects as such facilitates wire-bonding of the unit to the drive electronics. According to the present invention, the addition of multiple hairspring flexures connecting each end of the accelerometer block to the frame makes location of the input/output interconnects on one edge of the substrate possible. The multiple hairspring flexures add only a small percentage to the frequency of the dither, but allow all the paths needed to connect the dither drive, dither pick-off, tine drives and tine pick-offs. Thus, fabrication is simplified because electrodes are deposited on only one side of the substrate instead of on multiple parts.

According to one embodiment of the present invention, the strut members are connected to an upper epitaxial surface and are suspended over the accelerometer flexures. This strut configuration provides dither modulation control while reducing coupling into the accelerometer. The reduced coupling reduces coupling of external vibration and reduces bias errors. The above-described struts are preferably formed through silicon processing techniques which take into account the crystal structure of the silicon substrate and the etch characteristics along certain crystal planes. Specifically, in FIGS. 4–6, exemplary strut 98 is defined in part by an epitaxial shelf which is formed over the substrate. A surface 130 is defined between first surface 100 and flexure 36. Surface 130 defines a predetermined crystal plane. In the illustrated example, surface 130 defines the 111 crystal plane of the silicon substrate. A KOH etch is utilized, while the epitaxial shelf is back-biased, to desirably etch material from over flexure 36 and along surface 130. This etch desirably etches substrate material from underneath the epitaxial shelf defining strut 98. What is left after the etch is a cantilevered shelf which is disposed over flexure 36. Accordingly, the struts are formed. Formation of substrate 10 in general can take place through micromachining by various techniques such as wet and dry chemical etching. For example, techniques such plasma etching, sputter etching or reactive ion etching (RIE) can be utilized. For a detailed discussion of such techniques, reference is made to the following publications, which are incorporated herein by reference: VLSI *Fabrication Principles* by Sorab K. Ghandhi, and *Silicon Processing for the VLSI Era.,* Vols. 1–3, by S. Wolf & R. J. Tauber.

Prior art configurations maintained fixed pointing angles in inertial space at the expense of cross-axis linear vibration sensitivity. According to the present invention, both the rate axis and linear acceleration input axis rotate as a function of input g-load, which can be compensated in software. Both accelerometers have their flexure hinges on the bottom edge. Thus, under static g-loads, the pendulum or proof mass deflects slightly downward, changing the input axis direction by less than 10 μradians per g. The deflection gives rise to a cross-axis vibration sensitivity of about 10 $\mu g/g^2$. The cross-axis vibration sensitivity can be compensated in software because both the input angle value and the cross-axis terms are known values. The cross-axis vibration sensitivity aids cross-axis vibration rejection in the rate channel. Because the two input angles track and, in the rate channel, the accelerometer outputs are added, cross-axis linear acceleration is not picked-up. Note that linear acceleration input already cancels in the rate channel by having the gains match.

The push-pull beam or tine configuration uses the front side epitaxial surface only which provides excellent pendulum natural frequency matching. The tines each experience equal out-of-plane bending which provides good parameter matching. The invention provides separate drive and reference leads for the accelerometer tines. The dither drive and pick-off leads are separated and wrapped around to a common edge. The invention provides for small sensor size, on the order of 0.7-inch by 0.5-inch which allows for up to 24 sensors per 4-inch silicon wafer.

The invention has been described in compliance with the applicable statutes. Variations and modifications will be readily apparent to those of skill in the art. It is therefore to be understood that the invention is not limited to the specific features shown and described, since the disclosure comprises preferred forms of putting the invention into effect. The invention is, therefore, to be interpreted in light of the appended claims appropriately interpreted in accordance with the doctrine of equivalents.

I claim:

1. A method of forming a monolithic substrate for acceleration and angular rate sensing comprising:

providing a substrate;

etching the substrate to provide a support frame and at least one accelerometer, the at least one accelerometer comprising a proof mass and at least one flexure joined with and extending between the proof mass and the support frame for accommodating movement of the proof mass in accordance with an acceleration force; and forming a strut joined with and extending between the support frame and the proof mass, a portion of the strut or a portion of the at least one flexure being disposed over a portion of the other.

2. The method of forming a monolithic substrate for acceleration and angular rate sensing in accordance with claim 1, wherein the forming of the strut comprises etching material of the substrate over the at least one flexure.

3. The method of forming a monolithic substrate for acceleration and angular rate sensing in accordance with claim 1, wherein material of the strut comprises epitaxial material, and the forming of the strut comprises back-biasing the epitaxial material and etching material of the substrate along a predetermined crystal plane.

4. The method of forming a monolithic substrate for acceleration and angular rate sensing in accordance with claim 1, wherein the substrate comprises silicon.

\* \* \* \* \*